United States Patent [19]

Cordes et al.

[11] 4,298,519

[45] Nov. 3, 1981

[54] PLASTICIZER-CONTAINING THERMOCURABLE COMPOSITION

[75] Inventors: Johan H. Cordes, Naarden; Wilhelmus F. M. Roes, Beek, both of Netherlands

[73] Assignee: Akzo N.V., Arhem, Netherlands

[21] Appl. No.: 910,539

[22] Filed: May 30, 1978

[51] Int. Cl.³ .......................... C08K 5/02; C08L 67/00
[52] U.S. Cl. ............................. 260/33.8 UA; 528/207; 528/205
[58] Field of Search ............... 260/33.8 UA; 528/207, 528/205

[56] References Cited

U.S. PATENT DOCUMENTS

| | | | |
|---|---|---|---|
| 3,410,719 | 11/1968 | Roper | 428/462 |
| 3,547,851 | 12/1970 | Frauenglass | 260/33.8 UA |
| 3,607,816 | 9/1977 | Holzer et al. | 260/33.8 UA |
| 4,056,670 | 11/1977 | Skoultchi | 526/219 |

FOREIGN PATENT DOCUMENTS

2808140  9/1978  Fed. Rep. of Germany..260/33.8 UA 2210648 12/1974  France ....................... 260/33.8 UA

*Primary Examiner*—John Kight, III
*Assistant Examiner*—Peter F. Kulkosky
*Attorney, Agent, or Firm*—Stevens, Davis, Miller & Mosher

[57] ABSTRACT

A thermocurable composition based on an ethylenically unsaturated ester such as 2,2-bis-(p-$\beta$-hydroxyethoxy)-phenyl propane dimethacrylate and containing 2 to 60% by weight (calculated on the ethylenically unsaturated ester) of a chlorine-containing paraffin having an average molecular weight of 250 to 900 and an average chlorine content of 35 to 75% by weight.

9 Claims, No Drawings

PLASTICIZER-CONTAINING THERMOCURABLE COMPOSITION

The invention relates to a plasticizer-containing thermocurable composition based on an ethylenically unsaturated ester having the general formula:

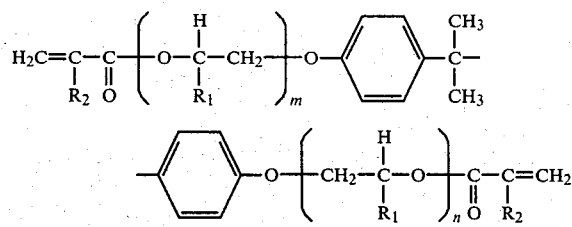

wherein $R_1$ and $R_2$ may be the same or different and represent a hydrogen atom and/or a methyl group, and m and n are numbers whose average is in the range of 1.0 to 3.0. It is preferred that 2,2-bis-(p-($\beta$-hydroxyethoxy)-phenyl)propane dimethacrylate is used as the ethylenically unsaturated ester. The above-envisaged ethylenically unsaturated esters are hereinafter referred to as (meth)acrylate monomer.

The (meth)acrylate monomer may be prepared in a known manner by direct esterification or transesterification of the corresponding diol respectively with acrylic acid and/or methacrylic acid in the presence of an acid esterification catalyst, or with a (meth)acrylic alkyl ester, for instance: methyl methacrylate in the presence of an acidic or basic catalyst. The esterification reaction is usually carried out in the presence of a polymerization-inhibiting compound. As a rule, the (meth) acrylate monomer need not be purified. There is no need for it to contain an organic solvent or a polymerizable monomer such as styrene. This is of importance in such cases where the law permits the use of only small amounts of such compounds. Owing to their absence there will be no environmental pollution during their processing. However, despite the fact that such additives are not present in the composition, the viscosity gradient will be optimal.

For a number of applications, such as the use of pigmented or non-pigmented coatings on substrates such as plywood, chip board, fibre board, plaster board and asbestos cement, and in the manufacture of glass-fibre reinforced objects such as containers and thin-walled tubes it appears that the (meth)acrylate monomer in the cured state is at least somewhat too brittle. A man skilled in the art is, of course, inclined to think that he can reduce the brittleness and thereby raise impact strength, the formation and further growth of hair cracks, bending strength, tensile strength and modulus all to an acceptable level by taking care that the (meth)acrylate monomer in the cured state contains a plasticizer. See, for instance, the U.S. Pat. No. 3,410,719 in which it is generally stated that compounds such as, for example, plasticizers, may be added to compounds that contain at least 2 acrylic groups per molecule.

It has been established, however, that the usual plasticizers such as tributyl citrate, tributyl phosphate, tricresyl phosphate and dioctyl phthalate are not suitable for use in the thermocurable composition according to the invention because they are incompatible with the cured or non-cured (meth)acrylate monomer or insufficiently decrease the brittleness of the cured product.

Surprisingly, however, it has now been found that very special compounds which are generally known to be used as plasticizer for polymers are very suitable to be employed as plasticizer for the present (meth)acrylate monomer in the cured state. These very specific compounds actually reduce the brittleness of the cured product to a sufficient extent and raise other mechanical properties to the desired level.

The present invention provides a thermocurable composition which is characterized in that it contains as plasticizer 2 to 60% by weight (calculated on the (meth)acrylate monomer) of a chlorine-containing paraffin having an average molecular weight of 250 to 900 and an average chlorine content of 35 to 75% by weight.

It is preferred that the chlorine-containing paraffin has an average molecular weight in the range of 300 to 700 and an average chlorine content of 45 to 65% by weight. By paraffin is to be understood here an aliphatic hydrocarbon containing 10 to 25 carbon atoms. The chlorine-containing paraffins may be liquid or solid; it is also possible to use mixtures of liquid and/or solid chlorine-containing paraffins.

The chlorine-containing paraffin may be mixed with the (meth)acrylate monomer in any desirable manner, for instance by mixing it, with stirring, while in the molten or liquid state, with the (meth)acrylate monomer at a suitable temperature, and preferably at ambient temperature. The thermocurable composition may, if desired, contain usual pigments, colouring agents, curing agents, fillers, adjuvants and other additives.

The composition is preferably cured with the aid of a radical initiator, for instance a peroxidic compound, and azo compound or a compound such as hexaphenyl ethane or 1,2-diphenyl-1,2-dicarboxylic dimethyl ester. As suitable peroxidic compounds may be mentioned benzoyl peroxide, methylethyl ketone peroxide, cumenehydroperoxide and tert. butyloxy-2-ethylhexanoate. Also mixtures of the above-envisaged radical initiators may be used. It is preferred that use should be made of radical initiators which are applicable at temperatures in the range of 60° to 175° C. and preferably in the range of 120° to 160° C. The composition generally contains 0.05 to 5% by weight of the radical initiator and preferably 0.5 to 2% by weight, based on the (meth)acrylate monomer. The composition may, if desired, be cured at temperatures below 60° C., for instance at ambient temperature, use being made of the above-envisaged initiators in combination with polymerization accelerators such as cobalt octoate or amines such as dimethylaniline. Curing may also be carried out by means of UV-radiation with the use of UV-initiators, or by radiation with accelerated electrons.

The compositions may be used for many different purposes, for instance as coating on a substrate, such as on decorative paper, so-called overlay paper ($\alpha$-methyl cellulose), kraft paper, hardboard, plywood, chip board, asbestos cement, glass fibres, textile and non-woven sheet material. The moisture content of the substrate is of no predominant influence on the quality of the substrate coated with the composition, so that there is no need for the substrate to be conditioned. The substrate may be superficially coated with a thin layer of the composition, which is used in an amount of, say, 50–500 g/m$^2$.

In the manufacture of laminates it is possible, for instance, for paper to be impregnated with the composition according to the invention, the paper serving as resin carrier and possibly also to give a decorative effect, after which one or more layers of the paper are placed on a substrate and the assembly is cured. The impregnated layers of paper may, of course, also first be assembled and cured and subsequently be attached to a substrate, for instance by gluing.

The resulting laminates may be advantageously applied for the manufacture of, for instance, kitchen units, doors, living room and bedroom furniture, tables, partitions, laminates for electrical insulation and paper cylinders. Application of the composition to a substrate may be carried out in any desirable manner, for instance by dipping, brushing or spraying, or by means of a kiss roll, a padding mangle or a knife coater.

In the afore-mentioned fields of application curing may be carried out for instance by passing the substrate over a heated roll, or with use being made of a heated press. Impregnation and/or curing may be effected continuously, if desired; it is also possible, however, to use a discontinuous or semi-continuous method. The curing temperature is generally in the range of 120° to 160° C.; the curing time as a rule ranges from 3 seconds to 5 minutes. There is generally no need for aftercuring. Pressure during curing will on the whole be below 20 kg/cm², and preferably between about 0 and 15 kg/cm². Substrates sensitive to pressure, such as plaster board, foamed substrates or substrates having a honeycomb structure can consequently be coated without any difficulty.

Another application of the composition is in the field of the manufacture of objects reinforced with glass fibre, such as pipe lines, containers, etc., which can be effected in a simple manner, for instance: continuously, semi-continuously or discontinuously, use being made of known techniques such as filament winding, hand lay up and cold or hot moulding. Curing may then be carried out at temperatures generally in the range of 5° to 175° C., more particularly in the range of 5° to 60° C. or 120° to 160° C., depending on whether in addition to a radical initiator one or more accelerators are used. The curing time is generally 10 minutes to 24 hours or even longer, and preferably from 30 minutes to 10 hours.

The present invention provides a composition which is not toxic during its being worked up in normal workshops and when being applied displays an optimum viscosity gradient, as a result of which the pressure which might have to be used can be kept low. The product obtained upon curing is chemically resistant, electrically insulating, mechanically strong, colourless and non-discolorating and resistant to high temperature.

The invention will be further described in the follwoing examples, which are intended as illustrative only. The impact strength is measured in accordance with DIN 53453 (Charpy). The formation and growth of hair cracks is measured in a temperature-change resistance test (the "cold-check" test) in accordance with ASTM D 1211/60.

EXAMPLE 1

89 parts by weight of 2,2 bis-(p-(β-hydroxyethoxy)-phenyl)propane dimethacrylate having a viscosity of 25 P (20° C.), 10 parts of weight of a chlorine-containing paraffin having an average molecular weight of 700 and an average chlorine content of 60% by weight and 1 part by weight of dibenzoyl peroxide were intermixed and the resulting plasticizer-containing thermocurable composition was applied to mahogany plywood in an amount of 150 grammes per m² with the aid of a kiss roll. The coated substrated was cured for 30 seconds at a pressure of 10 kg/cm² and a panel temperature of 150° C. The substrate was cooled to the air. In the "cold-check" test the coating displayed a value of over 150 cycles.

When this Example was repeated for comparison, but with the use of a composition which did not contain a plasticizer and had been prepared from 99 parts by weight of 2,2-bis-(p-(β-hydroxyethoxy)-phenyl)-propane dimethacrylate, and 1 part by weight of dibenzoyl peroxide, a value of less than 100 cycles was attained in the cold-check test.

When this Example was again repeated for comparison, but with the use as plasticizing agent successively of tricresyl phosphate, dioctylphthalate and tributyl citrate instead of the chlorinecontaining paraffin, the value attained in the cold-check test was also less than 100 cycles.

EXAMPLE 2

A composition made up of 100 parts by weight of 2,2-bis-(p-β-hydroxyethoxy)-phenyl)propane dimethacrylate, 1 part of weight of dibenzoyl peroxide and chlorine-containing paraffin in an amount mentioned in Table 1 and having an average molecular weight of 460 and an average chlorine content of 65% by weight was poured between glass plates to a coating thickness of 4 mm and cured at a temperature of 70° C. for 24 hours and aftercured at a temperature of 120° C. for 2 hours. Of the test specimens obtained the impact strength was determined and listed in Table 1, the impact strength of the control sample (without plasticizer) being taken as 100.

TABLE 1

| Sample | Amount of plasticizer (in parts by weight) | Impact strength |
|---|---|---|
| 1 | 0 (control) | 100 |
| 2 | 5 | 132 |
| 3 | 10 | 168 |
| 4 | 25 | 196 |
| 5 | 50 | 244 |

What is claimed is:

1. A thermocurable composition based on an ethylenically unsaturated ester having the general formula:

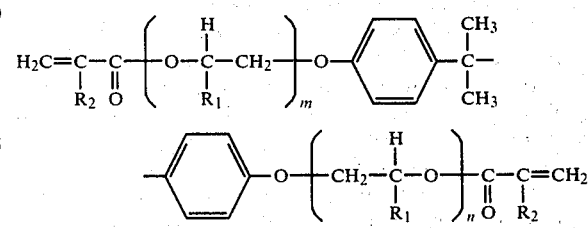

wherein $R_1$ and $R_2$ may be the same or different and represent a hydrogen atom or a methyl group, and m and n are numbers whose average is in the range of 1.0 to 3.0, characterized in that the composition contains as a plasticizer 2 to 60% by weight (calculated on the ethylenically unsaturated ester) of a chlorine-containing paraffin having an average molecular weight of 250 to 900 and an average chlorine content of 35 to 75% by weight.

2. The composition of claim 1, characterized in that the chlorine-containing paraffin has an average molecular weight of 300 to 700.

3. The composition of claim 1, characterized in that the chlorine-containing paraffin has an average chlorine content in the range of 45 to 65% by weight.

4. The composition of claim 1, characterized in that the composition contains a radical initiator.

5. The composition of claim 1, characterized in that the ethylenically unsaturated ester is 2,2-bis-(p-($\beta$-hydroxyethoxy)-phenyl) propane dimethacrylate.

6. A process for curing a thermocurable composition, characterized in that the composition of claim 1 is cured at a temperature in the range of 5° to 175° C.

7. A cured composition obtained by the process of claim 6.

8. A process for simultaneously curing and plasticizing a composition which contains an unsaturated ester having the formula:

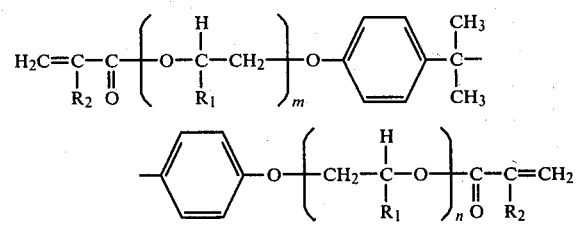

wherein $R_1$ and $R_2$ are hydrogen or methyl and m and n are integers averaging 1 to 3, said process comprising mixing with the composition from 2 to 60% by weight based on the weight of said ester of a chlorinated paraffin plasticizer having an average molecular weight of 250 to 900 and an average chlorine content of 35% to 75% by weight at a temperature at which the said chlorinated paraffin is a liquid, and heating the resulting mixture until the composition is converted into a plasticized cured composition.

9. A thermocurable composition consisting essentially of an ethylenically unsaturated ester of the formula

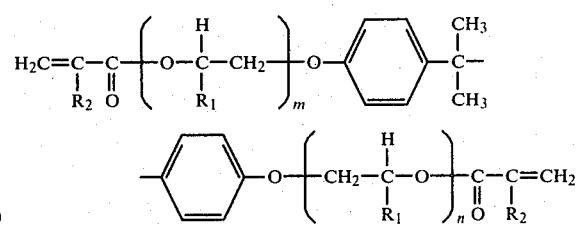

wherein $R_1$ and $R_2$ may be the same or different and represent a hydrogen atom or a methyl group, and m and n are numbers whose average is in the range of 1.0 to 3.0, and from 2 to 60% by weight of a chlorine-containing paraffin, characterized in that the composition contains as a plasticizer 2 to 60% by weight (calculated on the weight of ethylenically unsaturated ester) of a chlorine-containing paraffin having an average molecular weight of 250 to 900 and an average chlorine content of 35 to 75% by weight, said chlorine containing paraffin being a plasticizer for the composition.

* * * * *